United States Patent [19]

Arai

[11] Patent Number: 4,562,750

[45] Date of Patent: Jan. 7, 1986

[54] CARRIER-DRIVING DEVICE

[75] Inventor: Kureo Arai, Tomioka, Japan

[73] Assignees: Yokowo Manufacturing Co., Ltd.; Sony Corporation, both of Tokyo, Japan

[21] Appl. No.: 322,341

[22] Filed: Nov. 18, 1981

[30] Foreign Application Priority Data

| Nov. 22, 1980 | [JP] | Japan | 55-168053[U] |
| Nov. 22, 1980 | [JP] | Japan | 55-168054[U] |
| Jan. 8, 1981 | [JP] | Japan | 56-1422[U] |
| Jan. 8, 1981 | [JP] | Japan | 56-1423[U] |
| Feb. 28, 1981 | [JP] | Japan | 56-28029[U] |

[51] Int. Cl.[4] ............................................. F16H 27/02
[52] U.S. Cl. .................................... 74/89.21; 52/121; 74/89.2; 74/625
[58] Field of Search ............... 74/89.2, 89.21, 625; 52/108, 121; 464/39; 192/30 W, 56 R

[56] References Cited

U.S. PATENT DOCUMENTS

| 2,111,280 | 3/1938 | Connell | 192/56 R X |
| 2,524,508 | 10/1950 | Barnes | 74/89.2 |
| 2,581,171 | 1/1952 | Carlson | 52/121 X |
| 2,621,863 | 12/1952 | Nagel | 52/121 |
| 2,674,108 | 4/1954 | Latimer | 464/39 |
| 2,703,991 | 3/1955 | Kron et al. | 74/625 |
| 2,709,220 | 5/1955 | Spector | 52/121 |
| 2,989,878 | 6/1961 | Denkowski et al. | 74/625 |
| 3,216,278 | 11/1965 | Plume | 74/625 |
| 3,726,155 | 4/1973 | Denkowski et al. | 74/625 |
| 3,749,439 | 7/1973 | Ferguson | 52/108 X |
| 3,960,039 | 6/1976 | Nash et al. | 464/39 X |
| 4,185,511 | 1/1980 | Blackburn et al. | 464/39 X |
| 4,257,147 | 3/1981 | Moss | 192/56 R X |
| 4,340,133 | 7/1982 | Blersch | 192/56 R X |

FOREIGN PATENT DOCUMENTS

| 136415 | 7/1979 | Fed. Rep. of Germany | 192/30 W |
| 434205 | 12/1974 | U.S.S.R. | 192/30 W |

Primary Examiner—Rodney H. Bonck
Assistant Examiner—Dwight G. Diehl
Attorney, Agent, or Firm—Martin A. Farber

[57] ABSTRACT

A carrier-driving device mainly used for a video-projection system, preferably comprising a carrying member to be loaded with a projector mirror; two supporting arm assemblies each having telescopically elongatable hollow arms, on which the carrying member is supported; two driving cables for moving the hollow arms telescopically; driving wheels having peripheral teeth and engaging with the cable; a device for rotating the wheels; and a disengaging device for disengaging the drive wheels so that the mirror can be manually actuated when needed. The cables are each characterized by a belt-like shaped central portion, with strong and resilient side portions formed on both sides of the central portion and a plurality of holes so formed in the central portion as to be aligned in the longitudinal direction of the cable at a predetermined pitch, thereby to engage the holes with the peripheral teeth of the respective drive wheel.

9 Claims, 16 Drawing Figures

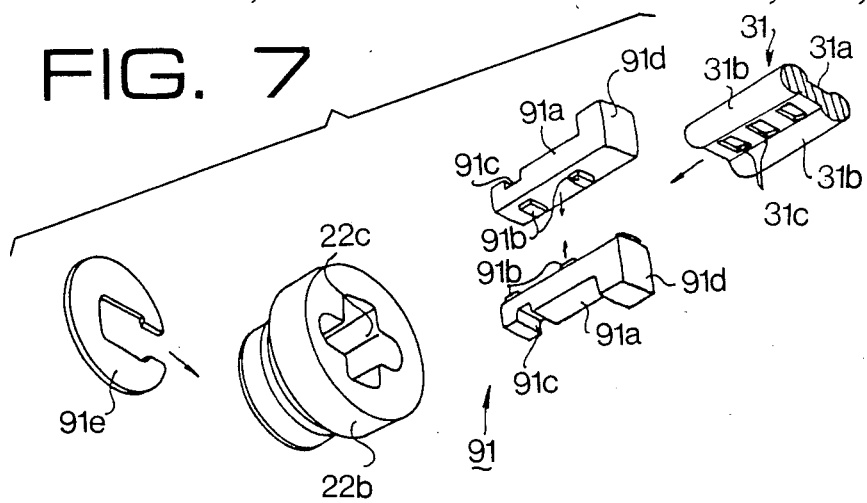
FIG. 7
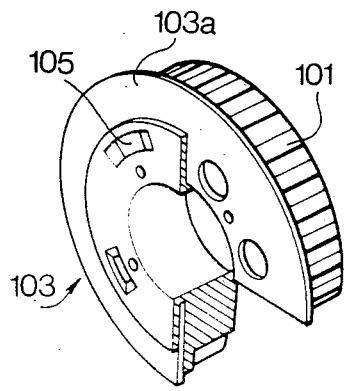
FIG. 9
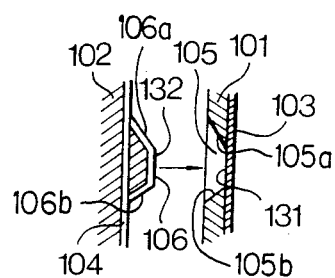
FIG. 10
FIG. 11

FIG.12
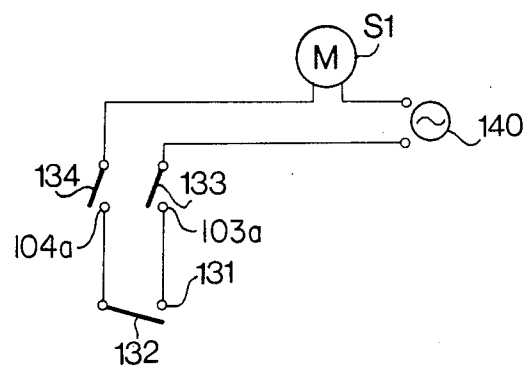
FIG.13
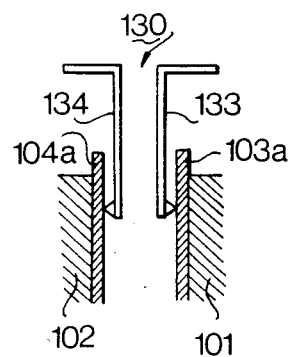
FIG.14
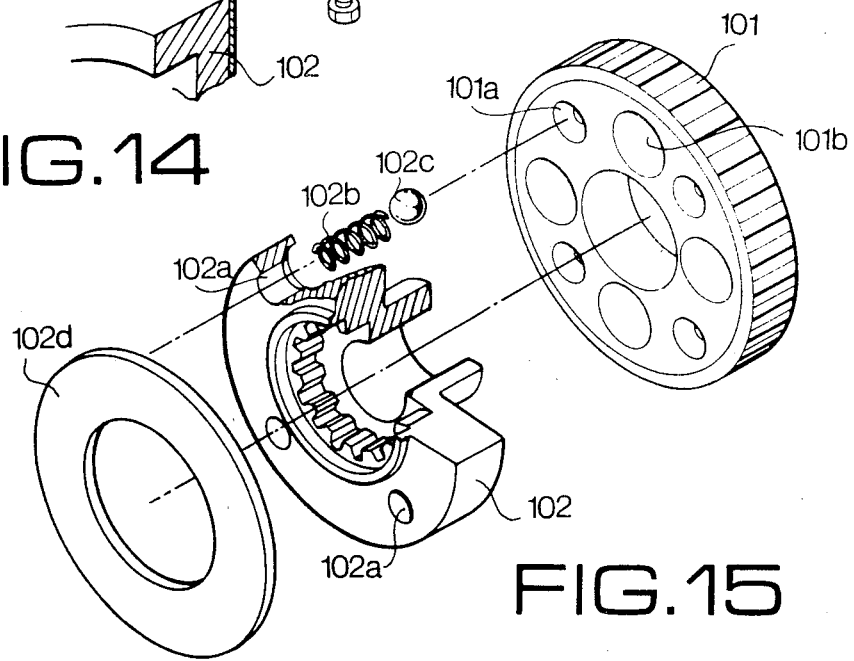
FIG.15

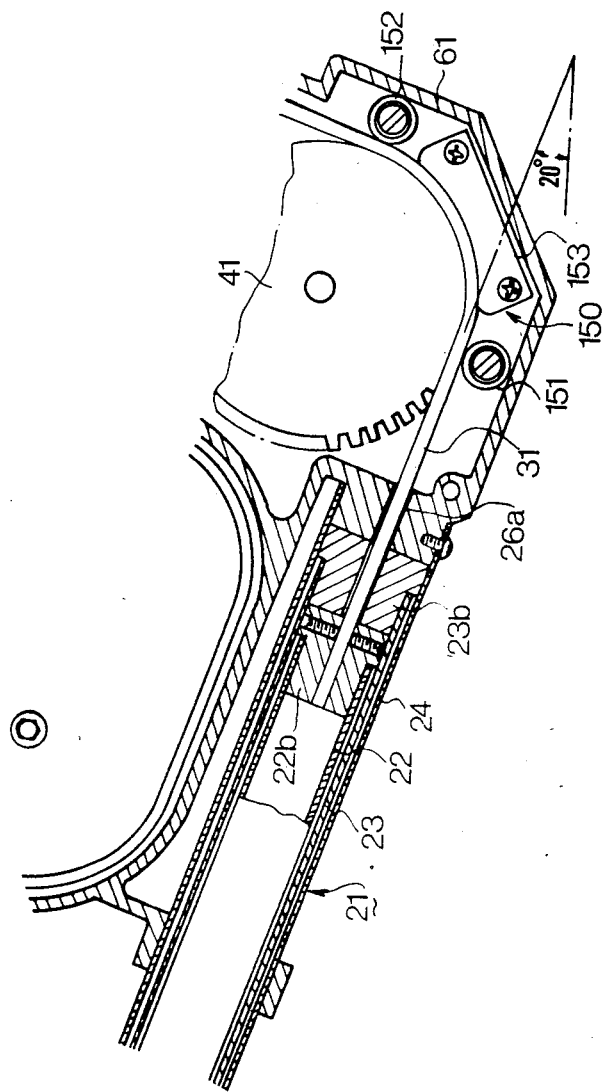

CARRIER-DRIVING DEVICE

BACKGROUND OF THE INVENTION

1. Field of the Invention

The present invention relates to a carrier-driving device mainly used for such a system as a video-projection system and television system, and more particularly to a carrier-driving device in which a carrier member bears a projector mirror adapted to the system.

2. Description of Related Art

Such a carrier-driving device includes supporting arm assemblies for supporting the carrier member and telescopically transporting it in a direction upwardly inclined to a horizontal direction. One goal in this case is to transport the carrier member when carrying a heavy load only by means of driving cables. Such cable should be provided with sufficient hardness in order to bear the load applied to the supporting arm without its bending, with necessary flexibility in order to be sufficiently engageable with a driving wheel and a diametrical size restricted in order to be inserted into the hollow portions of the supporting arms.

Furthermore, a driving wheel should preferably be controllable by manual operation, when it is necessary, such as when the driving motor becomes disabled.

In order to maintain safe operation, when an overload condition occurs on the supporting arm, the driving wheel made be made capable of being separated from the driving source, for instance, from a driving electric motor, when overloaded. Also, the electric motor may be controlled to be automatically stopped upon detection of this overload condition.

It is an object of the invention to provide a carrier-driving device which meets the above specifications.

SUMMARY OF THE INVENTION

This invention provides a carrier-driving device including driving cables each having a special and distinct structure, so as to maintain the sufficient strength, necessary flexibility and suitable size, thereby to control the supporting arms with precision.

This invention also provides a carrier-driving device including driving wheels corresponding to the cables, which are generally operated by a driving motor and where means are provided so the device can be operated manually if necessary. Furthermore, this invention provides a carrier-driving device including clutch means through which the driving being adapted to disengage the driving wheel and driving motor upon overload.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 7 is an exploded perspective view of a cable joining means included in the device of FIG. 1;

FIG. 9 is a perspective view of an intermeshing member in a driving side of the clutch means of FIG. 8;

FIG. 10 is a perspective view of an intermeshing member in a driven side of the clutch means of FIG. 8;

FIG. 11 is an enlarged cross section of the parts of the intermeshing members of FIGS. 9 and 10;

FIG. 12 is an electric circuit of means for switching on and off an electric circuit of a driving motor included in the device of FIG. 1;

FIG. 13 is a cross section of switching elements included in the means of FIG. 12;

FIG. 14 is an exploded perspective view of the switching elements of FIG. 13;

FIG. 15 is an exploded perspective view of a clutch means in an alternative embodiment of the invention; and FIG. 16 is a vertical cross-section of means for fitting the driving cable to the intermeshed portion of the driving wheel in an alternative embodiment of the invention.

DESCRIPTION OF PREFERRED EMBODIMENT

Figure 1:
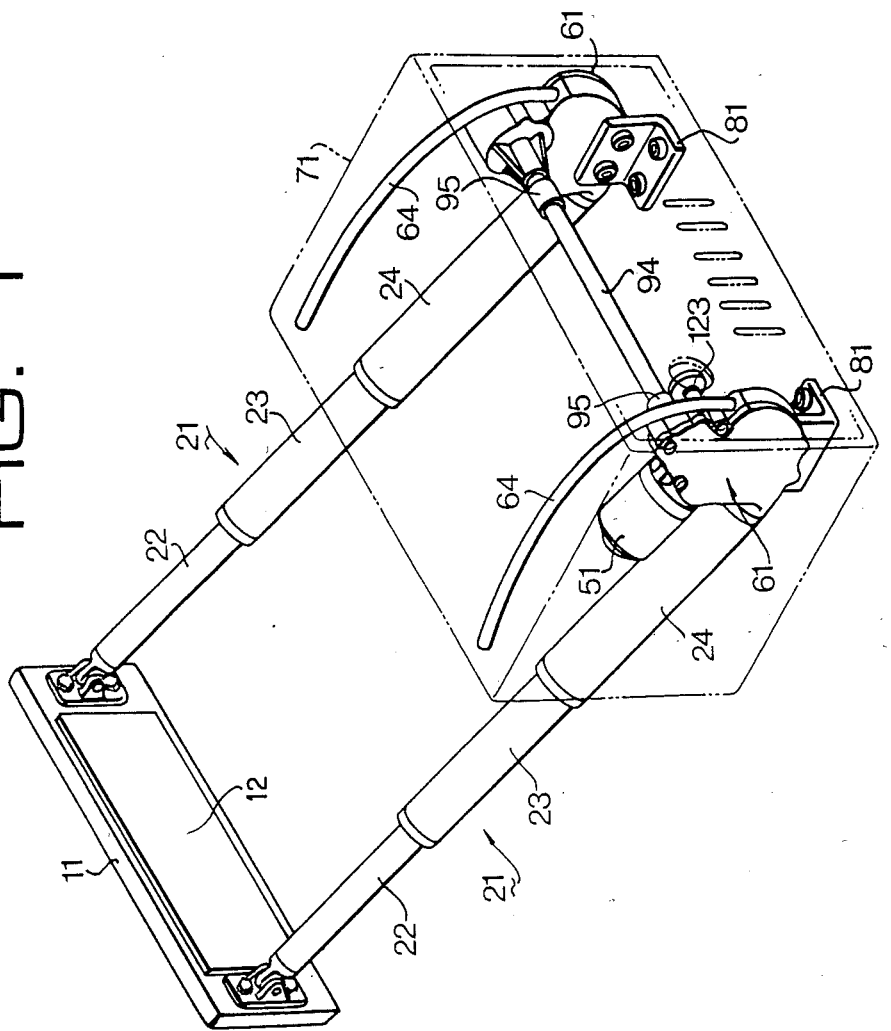
FIG. 1 is a perspective view of a carrier-driving device embodying this invention.

As referring to FIGS. 1 to 14, there is provided a preferred embodiment of a carrier-driving device of the invention. The carrier-driving device generally includes a carrying member 11, which is to be loaded; a pair of supporting arm assemblies 21 each having telescopically elongatable hollow arms 22 and 23, by which the carrying member 11 is supported; a pair of driving cables 31 for moving the hollow arms 22 and 23 telescopically, respectively; toothed driving wheels 41 each engaging with the respective cable 31; and means 51 for rotating the wheels 41.

In this embodiment, the carrying member 11 is shaped into a rectangular plate and carries a projector mirror 12, and each supporting arm assembly 21 includes a stationary hollow arm 24 capable of containing the hollow arms 22 and 23 telescopically. The stationary hollow arm 24 is attached to a housing 61 which is fixed to the bottom portion of a box-shaped casing 71 by means of an L-shaped base bracket 81.

The hollow arms 23 and 24 are proved with guiding bushings 23a and 24a with flanges attached to the front ends thereof respectively. The hollow arms 22 and 23 have slide bushings 22b and 23b with flanges attached to the rear ends thereof, respectively. The slide bushing 23b has a passage through which the cable is loosely penetrated, and the slide bushing 22b has an X-cross-sectional hole 22c for a cable joining means 91 by which the front end of the cable 31 is connected with the slide bushing 22b.

To the front end of the hollow arm 22, a connector 22d is fixedly inserted so as to couple arm 22 and the carrying member 11.

The hollow arms 23 and 24 further have inner wall members 23c and 24c fixedly inserted thereto so as to support the inside arms 22 and 23 in smoothly slidable conditions respectively.

If necessary, in this embodiment, the hollow arms 22, 23 and 24 may be made from aluminum tubes, and the bushings 23a, 24a, 22b, 23b may be made of hard plastic resin.

Figure 5:
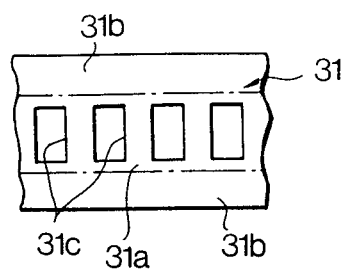
FIG. 5 is a cross-sectional view of a driving cable included in the device of FIG. 1.
Figure 6:
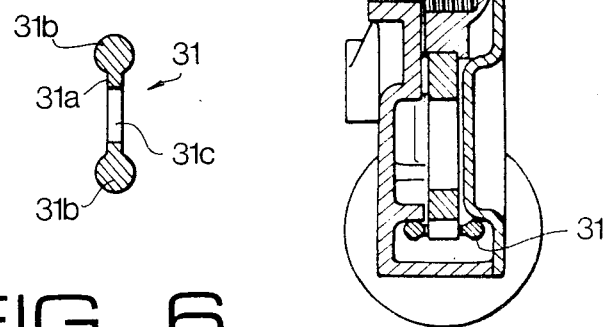
FIG. 6 is a side view of a portion of the driving cable of FIG. 5.

As seen in FIGS. 5 and 6, the cable 31 has a belt-like shaped central portion 31a, having strong and resilient, sinewy side portions 31b integrally formed on both sides of the central portion 31a and each having a circular cross-section, and a plurality of rectangular holes 31c formed in the central portion 31a aligned in the longitudinal direction of the cable 31 at a predetermined pitch.

Figure 2:
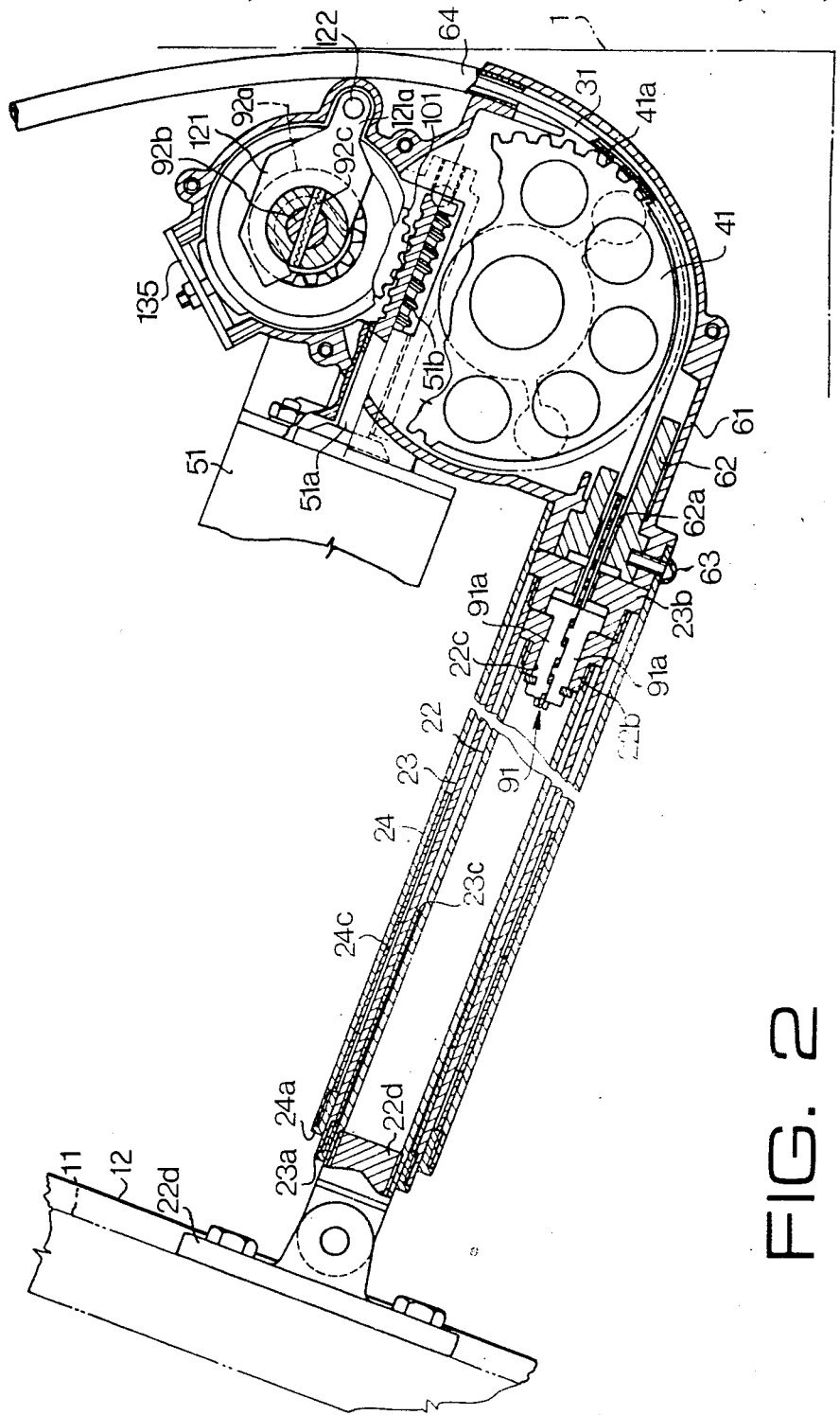
FIG. 2 is a vertical cross-section of the device of FIG. 1.

The cable joining means 91 includes, as shown in FIGS. 2 and 7, a pair of clamping pieces 91a. These pieces 91a have engaging protrusions 91b formed to be placed in positions different from each other according to the applying position of the clamping pieces 91a, grooves 91c formed on front end portions of the clamping pieces 91a, flanges 91d formed at rear end portions of the clamping pieces 91a, and a C-shaped stop ring 91e to be inserted in the grooves 91c.

The clamping pieces 91a are coupled to each other via the central portion 31a of the cable 31 with the protrusions 91b being engaged with various of the holes 31c, and are inserted into the hole 22c of bushing 22b together with the front end of the cable 31 until the flanges 91d are in contact with the rear end of the bushing 22b. Thereafter, the stop ring 91e is placed one the front end of the bushing 22b and is engaged in the grooves 91c, whereby the cable 31 is fixedly connected with the bushing 22c.

Inserted into the housing 61 is a slide sleeve 62, which is fixed to the housing 61 by means of a set screw 63 and has a passage 62a through which the cable 31 passes smoothly.

Each of the driving wheels 41 includes a plurality of teeth 41a of rectangular shape integrally formed to the periphery thereof. The teeth 41a are able to be engaged with holes 31c of the cable so as to move the cable 31 alternatively in advancing and reversing directions.

The free end portion of the cable 31 is loosely inserted in a guide tube 64 attached to the housing 61. A separate cable preferably drives each drive wheel.

The driving wheels 41 are engaged with pinions 92a and 93a respectively. The pinion 92a is coupled to a driven shaft 92b by means of a cross pin 92c in a manner to be slidable in the axial direction of the shaft 92b due to a slide slit 92d formed in the end of the shaft 92b and in which the cross pin 92c movably sets.

To prevent the cross pin 92c from being dislodged from the slit 92d, there is provided an end plate 92e attached to the end portion of the shaft 92b.

The pinion 93a is secured to a driven shaft 93b by means of a cross pin 93c.

Figure 8:
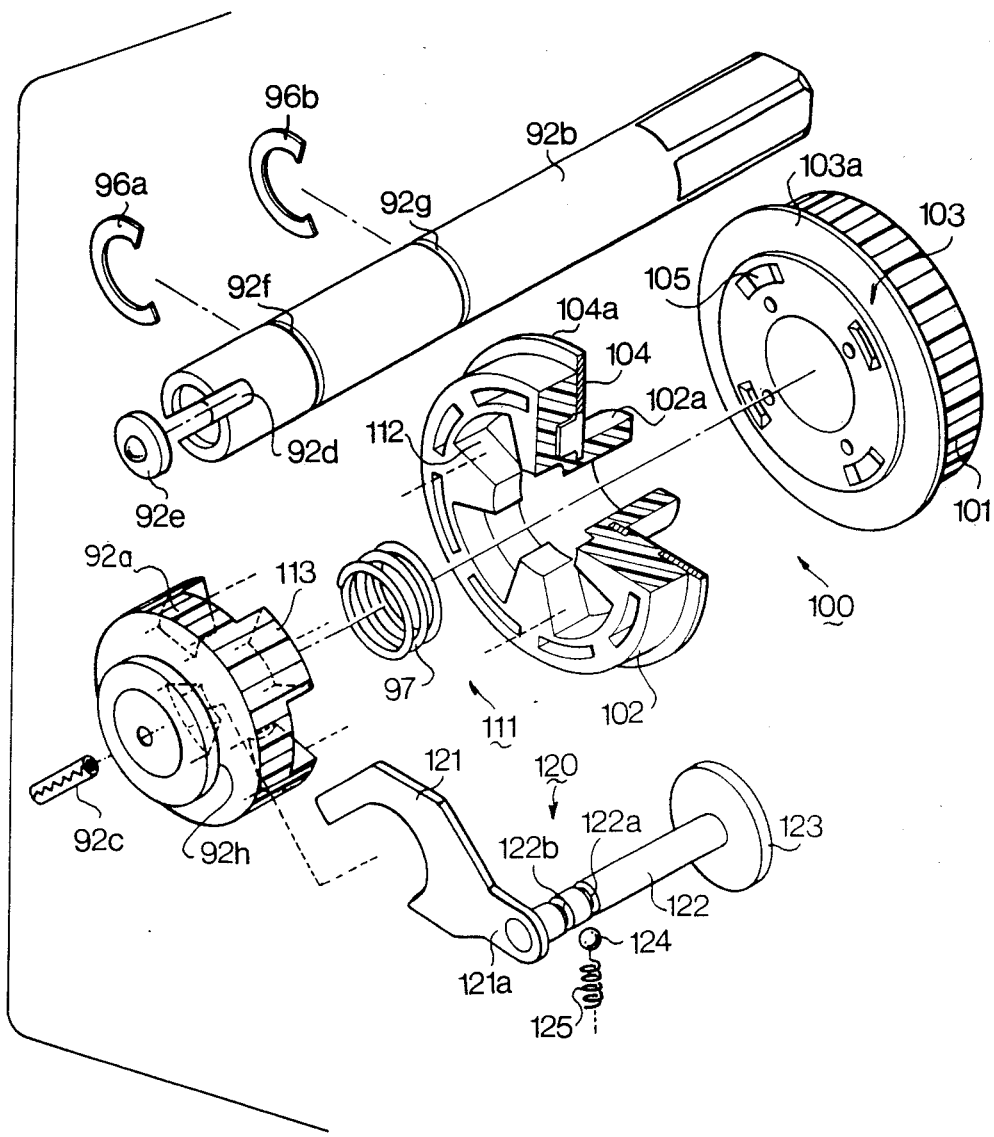
FIG. 8 is an exploded perspective view of clutch means included in the device of FIG. 1.

The driven shafts 92b and 93b are connected with each other through a connecting rod 94 and flexible connectors 95 attached to both ends of the rod 94 and to ends of the shafts 92b and 93b, respectively and are journalled in the housings 61 respectively by means of oilless sleeves 65. Two circular grooves 92f and 92g are formed on the driven shaft 92b for fitting stop rings 96a and 96b thereto, as seen in FIG. 8.

Figure 3:
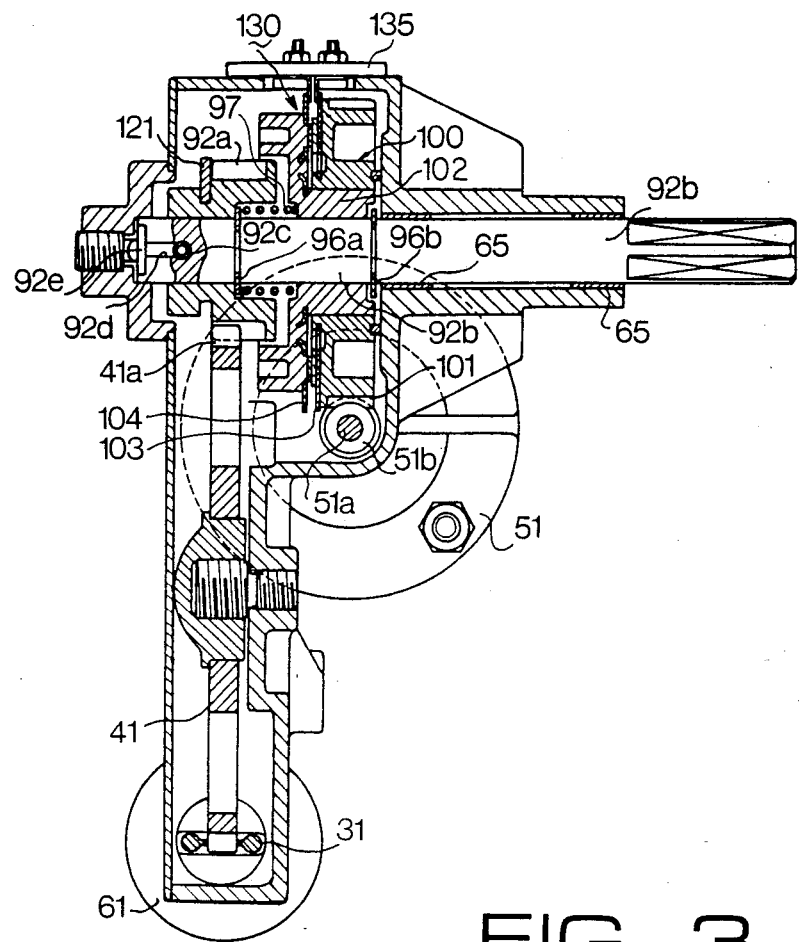
FIG. 3 is a vertical cross-section of the device of FIG. 1, shown in another section.
Figure 4:
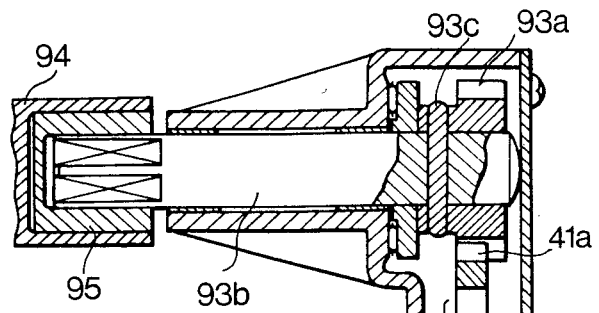
FIG. 4 is a vertical cross-section of the device of FIG. 1, shown in the other section.

As seen in FIGS. 3, 9 and 10, the rotating means 51 is a driving electric motor in this embodiment, and is connected with the driving wheel 41 through clutch means 100. In detail, the electric motor 51 includes an output shaft 51a to which is attached a worm gear 51b which intermeshed with a worm wheel 101. The latter is included in the clutch means 100 and is adapted to be used as an intermeshing member in driving side of the clutch.

The clutch means 100 further includes an intermeshing member 102 on the driven side of the clutch. The intermeshing member 102 has a slide boss 102a on which the clutch worm wheel 101 is slidably and rotatably supported. The intermeshing members 101 and 102 are mutually pressed together by means of spring bias 97 disposed between the end of the intermeshing member 102 and the stop ring 96a.

The intermeshing members 101 and 102 have metal discs 103 and 104 embedded therein respectively. The flanged peripheral portions 103a and 104a of the discs 103 and 104 protrude beyond the intermeshing members 101 and 102 respectively, so as to form electric contact areas.

The intermeshing members 101 and 102 further include a plurality of cavities 105 and protrusions 106, respectively, mutually coupled and arranged on a circle about the rotating axis of the shaft 92b.

The cavities and protrusions 105 and 106 include two slant ends. Accordingly, the clutch means 100 is maintained in engagement thereof when the driving wheels 41 are operated under a prescribed load, when the driving wheels 41 are loaded over the prescribed load, the clutch means 100 is changed from the engaging condition to the disengaging condition in such manner that the intermeshing members 101 and 102 are disengaged from each other by rising on one of the slant ends.

In this embodiment, as seen in FIG. 11, the cavities and protrusions 105 and 106, respectively, include two slant ends 105a, 105b, 106a and 106b having different coordinated inclinations, so that the intermeshing members 101 and 102 are disengaged with each other by different overloads according to either the advancing or reversing direction of the driving of the driving wheels 41.

Hence, when the cable 31 is moved in the advancing direction, the power is transmitted from the intermeshing member 101 to the intermeshing member 102 by means of one of the slant ends having the large inclination. And when the cable 31 is moved in the reversing direction, the power is transmitted by means of the other of the slant ends having the small inclination. Accordingly, when the carrying member 11 is returned toward the casing 71 by the returning movement of the hollow arms 22 and 23, any accidental overload will easily release the movement of the cable.

Furthermore, as seen in FIG. 8, the intermeshing member 102 comprises fan-shaped recesses 112 included in a dog-clutch mechanism 111. The dog-clutch mechanism 111 includes corresponding projections 113 formed on the pinion 92a. The dog-clutch mechanism 111 is generally closed so that the rotation of the motor 51 is transmitted to the driving wheels 41 via the clutch means 100, shafts 92b and 93b, and connecting rod 94, thereby to move the cable in either the advancing direction and reversing direction.

This dog-clutch mechanism 111 is used in order to manually operate the projector mirror 12 when the rotating means 51 is out of order. FIG. 8 indicates means 120 for disengaging the clutch means 100 from the driving wheels 41. The disengaging means 120 includes a shift fork member 121 having an arm 121a integrally formed thereto and slidably inserted in the guide groove 92h formed in the boss of the pinion 92a, an operation rod 122 attached to the arm 121a, a handle 123 attached to the rod 122, two circular notches 122a and 122b formed in the periphery of the rod 122, and a stopping ball 124 depressed to the periphery of the rod 122 by means of spring bias 125 and disposed to be settle in either one of the notches 122a and 122b.

Accordingly, when the handle 123 is pushed thereby, changing the engagement of the ball 124 from the notch 122b to the notch 122a, the shift fork member 121 causes the pinion 92a to be shifted along the length of the shaft 92b, so that the projections 113 move away from the recesses 112 causing disengagement of the dog-clutch. Thus, the driving wheels 41 become free from the engagement of the clutch means. In this situation, as will be appreciated by those of ordinary skill in the art, the support arms 21 and the drive wheels 41 can now be manually operated by pulling or pushing the carrying member 11 or projector mirror 12 manually. Conversely, when the handle 123 is pulled, the ball 124 leaves the notch 122a and engages in the notch 122b thereby to cause the dog-clutch mechanism 111 to be engaged, such that the driving wheels 41 are now in the condition where they can be rotated via the clutch means 100 by the electric motor 51.

In this embodiment, as seen in FIGS. 3, 12 and 13, there are provided means 130 for switching on and off an electric source circuit adapted to the motor 51. The switching means 130 is so operated as to depend upon the engagement and disengagement of the clutch means. Namely, the flange surface 103a of the metal plate 103 is coupled to the bottoms of the cavities 105 which act as schematically shown (FIG. 12) electric contact points 131. The flange surface 104a of the metal plate 104 is coupled to protrusions 106, each protrusion including its top and slant portions 106a and 106b which act as schematically shown (FIG. 12) electric contact point 132. The switching means 130 further includes a pair of electric contact pieces or brushes 133 and 134 which are electrically coupled to the surfaces of the electric contact areas 103a and 104a by means of their elasticity and sliding action and act as the schematically shown (FIG. 12) electric contacts 133 and 134. The contact brushes 133 and 134 are secured to an insulating plate 135 disposed on the housing 61.

Accordingly, when the intermeshing members 101 and 102 are mutually coupled with the protrusions 106 being inserted to the cavities 105 by the spring bias, the source circuit of the motor 51 is electrically communicated with the electric source 140, due to the contact points 131 and 132 being closed, and the closed condition of the contact pieces 133 and 134 with the contact areas 103a and 104a, respectively.

When the intermeshing members 101 and 102 are disengaged from each other with the protrusions 106 being disengaged from the cavities 105, for instance, due to the wheels 41 being overloaded the contact points 131 and 132 are electrically disconnected, and the contact pieces 134 are detached from the contact area 104a. Accordingly, the source circuit of the motor 51 is electrically disconnected from the electric source 140.

This arrangement is advantageous particularly just after the transport of the supporting arms 22 and 23 when they are at their end of travel. At such time, since the motor should be automatically stopped, the switching mean conveniently switches the motor off.

Furthermore, in this embodiment, since the switching means is so operated as to depend upon the engagement and disengagement of the clutch means 100, the timing for switching off the motor circuit is completely synchronized even where the cables 31 are bent so as to generate a misalignment or misdistance in their transport.

FIG. 15 indicates a modification of the clutch means of this invention, which includes intermeshing members 101 and 102 made of metal. The intermeshing member 101 has four conical cavities 101a formed in a facing surface thereof radially located about the center axis of the member 101, and four insulating plates 101b attached to the same facing surface. The intermeshing members 102 has four housing apertures 102a facing to the conical cavities 101a, with four spring bias members 102b located in the apertures 102, respectively, and four balls 102c urged against the surface of the intermeshing member 101 by means of these spring bias members. Also, a circular plate 102d, which is attached to the intermeshing member 102, is placed in electrical contact with the balls 102c via the bias members 102b.

When the balls 102c are inserted into the cavities 101a, the intermeshing members 101 and 102 are engaged with each other, and when either one of the intermeshing members 101 or 102 is placed under overload, the balls 102c escape from the cavities 101a upon their rising along the conical surfaces of the cavities 101a, thereby to cause the intermeshing members 101 and 102 to be disengaged from each other.

Furthermore, when the balls 102c are transported to the above surface of the insulating plates 101b, electric insulation between the intermeshing members 101 and 102 is accomplished. Accordingly, if an electric switching circuit for motor 51 exists between the intermeshing members 101 and 102, the switching circuit is cut off simultaneously with the disengagement of the clutch means FIG. 16 indicates means 150 for fitting a cable 31 to the intermeshed portion (i.e., the intermeshed teeth 41a) of the periphery of a driving wheel 41. In this embodiment, the fitting means 150 is comprised of a pair of back-up rollers 151 and 152 disposed at ends of the intermeshed portion of the wheel 41, and an arc-shaped member 153 disposed between the back-up rollers 151 and 152 so as to prevent the cable 31 from being disengaged from the wheel teeth 41a.

Accordingly, the cable 31 is moved by advancing or reversing rotation of the wheel 41, in such a manner that many of the holes 31c of the cable are positively intermeshed with many teeth of the intermeshing portion of the driving wheel 41, whereby the cable is able to be used under heavy loads. However, the means 150 for fitting the cable 31 may be comprised of other mechanisms or assemblies.

What is claimed is:

1. A carrier-driving device for use in a video projection system, comprising a projector mirror; two supporting arm assemblies each having telescopically elongatable hollow arms by means of which the mirror is supportable; a pair of driving cables each for moving a respective one of the hollow arms telescopically, each cable having a belt-like shaped central portion, sinewy side portions integrally formed on both sides of the central portion and a plurality of holes defined by said central portion so as to be aligned in the longitudinal direction of the cable at a predetermined pitch; a pair of driving wheels each engagable respectively with a respective cable and having a plurality of teeth formed on the periphery thereof and each wheel capable of engaging with said defined holes in said respective cable so as to move that cable; and motor means for rotating the wheels.

2. The carrier-driving device according to claim 1, further comprising
   means for fitting a respective said cable to the intermeshed portion of the periphery of a said driving wheel.

3. The carrier-driving device according to claim 2, wherein
   the fitting means includes a pair of back-up rollers respectively disposed at the ends of the intermeshed portion of the wheel and an arc-shaped member disposed between the back-up rollers so as to prevent the cable from being disengaged from the wheel teeth.

4. The carrier-driving device according to claim 1, further comprising
   clutch means, through which the driving wheels are communicated with the rotating means, and which is adapted to be engaged with the rotating means when the driving wheels are operated under a predetermined load, and to be disengaged from the rotating means when the driving wheels are loaded over the predetermined load.

5. The carrier-driving device according to claim 4, further comprising
   means for disengaging said driving wheels from said rotating means, said disengaging means including a dog-clutch mechanism situated between the clutch means and at least one of the driving wheels, and a disengaging member which disengages said dog-clutch mechanism, thereby causing said driving wheels to be free from the engagement of the clutch means when the dog-clutch mechanism is disengaged.

6. The carrier-driving device according to claim 4, further comprising
   means for switching on and off an electric source circuit adapted to the rotating means, said switching means being so operated as to depend upon the engagement and disengagement of the clutch means.

7. The carrier-driving device according to claim 1, further comprising
   clutch means, through which said driving wheels are communicated with the rotating means, said clutch means including intermeshing members which are automatically disengageable from the rotating means in two conditions, in one of which the driving wheels are loaded over a predetermined load while moving the respective cables in an advancing direction, and in the other of which the driving wheels are loaded over another predetermined load less than the former said predetermined load while moving the respective cables in a reversing direction.

8. The carrier-driving device according to claim 7, wherein
   said intermeshing members are separated into a driving side and a driven side and are mutually depressed by spring bias, said intermeshing members having a plurality of protrusions and cavities mutually coupled and aligned on a circuit about the rotating axis of the members, at least either of said protrusions and cavities including two slant ends having different inclinations in such a manner that the intermeshing members are disengaged from each other by the rising up of said protrusions at the slant ends.

9. A carrier-driving device for use in a video projection system, comprising:
   a carrying member;
   two supporting arm assemblies each having telescopically elongatable hollow arms, on which said carrying member is supported;
   a pair of driving cables for moving said hollow arms, respectively, each cable having a belt-like shaped central portion, sinewy strong, flexible side portions integrally formed on both sides of said central portion and a plurality of holes defined by said central portion so as to be aligned in the longitudinal direction of said cables at a predetermined pitch;
   a pair of driving wheels each engaging with a respective one of said cables and having a plurality of teeth formed on the periphery thereof and each wheel capable of engaging with said defined holes so as to move said respective cable; and
   motor means for rotating the wheels; and wherein said carrying member comprises a projector mirror.

* * * * *